United States Patent
Tse et al.

(10) Patent No.: US 9,825,834 B2
(45) Date of Patent: Nov. 21, 2017

(54) NETWORK SPEED DETECTION (71) Applicant: AirWatch LLC, Atlanta, GA (US)

(72) Inventors: Kar Fai Tse, Peachtree Corners, GA (US); Eric Peter Stuntebeck, Marietta, GA (US); Chen Lu, Sandy Springs, GA (US)

(73) Assignee: AirWatch LLC, Atlanta, GA (US)

( * ) Notice: Subject to any disclaimer, the term of this patent is extended or adjusted under 35 U.S.C. 154(b) by 232 days.

(21) Appl. No.: 14/673,131

(22) Filed: Mar. 30, 2015

(65) Prior Publication Data
US 2016/0294656 A1 Oct. 6, 2016

(51) Int. Cl.
*H04L 12/26* (2006.01)
*H04L 12/24* (2006.01)
*H04L 29/08* (2006.01)

(52) U.S. Cl.
CPC ...... *H04L 43/0888* (2013.01); *H04L 41/0806* (2013.01); *H04L 43/08* (2013.01); *H04L 43/16* (2013.01); *H04L 43/50* (2013.01); *H04L 43/103* (2013.01); *H04L 67/18* (2013.01)

(58) Field of Classification Search
CPC .......... H04L 43/08; H04L 43/16; H04L 67/18
See application file for complete search history.

(56) References Cited

U.S. PATENT DOCUMENTS

| | | | | |
|---|---|---|---|---|
| 6,397,359 B1* | 5/2002 | Chandra | ............. | H04L 41/5009 709/224 |
| 6,422,141 B2* | 7/2002 | Yoshida | ............. | B41F 27/1206 101/177 |
| 8,997,091 B1* | 3/2015 | Watson | ...................... | G06F 8/60 717/170 |
| 9,130,839 B1* | 9/2015 | Krzanowski | ........ | H04L 43/0882 |
| 9,501,766 B2* | 11/2016 | Gamble | ............. | G06F 11/2221 |
| 9,668,136 B2* | 5/2017 | Mistry | .................. | H04L 63/083 |
| 2013/0254401 A1* | 9/2013 | Marshall | ............. | G06F 21/6218 709/226 |
| 2014/0259178 A1* | 9/2014 | Karaa | ...................... | G06F 8/61 726/27 |
| 2014/0330945 A1* | 11/2014 | Dabbiere | ............. | H04L 41/0843 709/220 |
| 2016/0094560 A1* | 3/2016 | Stuntebeck | ........... | H04L 63/102 726/1 |
| 2016/0094725 A1* | 3/2016 | Dabbiere | ............ | H04M 15/887 455/407 |
| 2016/0259941 A1* | 9/2016 | Vasudevan | ............ | G06F 21/575 |
| 2017/0026420 A1* | 1/2017 | Balacheff | ............... | G06Q 10/06 |

* cited by examiner

*Primary Examiner* — Lashonda Jacobs
(74) *Attorney, Agent, or Firm* — Thomas | Horstemeyer, LLP (57) ABSTRACT

Disclosed are various examples for facilitating network speed testing on behalf of a client device that is associated with an enterprise. In a client device that can be a managed device managed by a management service, a network testing profile can be obtained which specifies a testing schedule as well as a network testing endpoint with which network testing can be conducted. Results of the network speed test can be transmitted to the management service, which can determine if the network speed implicates a compliance rule associated with the client device or an enterprise with which the client device is associated.

20 Claims, 5 Drawing Sheets

NETWORK SPEED DETECTION

BACKGROUND

In an enterprise environment, a management service can be employed that manages client devices that are associated with various user accounts in the enterprise. Client devices can communicate with the management service through various types of network connections, wired or wireless carriers, private networks, or via the public Internet. The performance of a connection between the client device and the management service can affect user experience and quality in various ways.

A user or customer can report issues or errors with respect to the management service. In some cases, these errors are caused by or can be traceable to a quality or speed of a network connection. Therefore, collecting data with respect to network connections of devices associated with a management service can be desirable to provide data with respect to network connections of client devices. Potential errors or issues experienced by users with respect to the management service can be diagnosed or assessed based upon the collected data.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to assessing the speed, quality, or performance of a network connection of a client device with respect to a management service. In some scenarios, users in an enterprise environment can be provided with a client device, such as a smartphone, tablet device, a general purpose computing device, or other computing device. Users can also enroll their own devices within an enterprise environment. The client device can have access to enterprise resources, such as email, files, networks, and other enterprise resources. However, the client device can also be enrolled with a management service such that it becomes a managed device.

An enterprise can wish to define one or more compliance rules that can include policies with which a user or the client device must comply in order to access enterprise resources. These policies can include requirements with respect to a location of the device, whether software on the client device is modified, or a requirement that the client device execute a particular version or brand of operating system or other software. In addition, a compliance rule can specify that the client device should be in communication with a management service or a server on which the management service is executed with a connection having a minimum speed.

Additionally, systems administrators can wish to assess the speed or quality of a connection of a client device with the management service or a network on which the management service is placed for quality assurance, testing, or other profiling reasons. For example, if a user or enterprise is reporting errors or other issues with performance of a client device or degradation in user experience, an administrator can be able to make a determination with respect to the speed of a network connection of a client device as a potential culprit for the issues. Additionally, the enterprise can have in place compliance rules that specify actions that a client device managed by the management service should take if the speed of the network connection with the management service drops below a threshold. For example, if the speed of a network connection of the client device drops below a particular threshold, a compliance rule can specify that a videoconferencing capability or status of the client device be disabled until the speed of the network connection returns to an acceptable level. As another example, if the speed of the network connection is unacceptably low, a compliance rule can specify that an email client executed by the client device avoid automatically downloading email attachments. The compliance rule can also specify that the client device should access lower quality multimedia until the speed of the network connection returns to an acceptable level.

Other examples and variations are discussed in further detail herein. In the following discussion, a general description of the system and its components is provided, followed by a discussion of the operation of the same.

Figure 1:
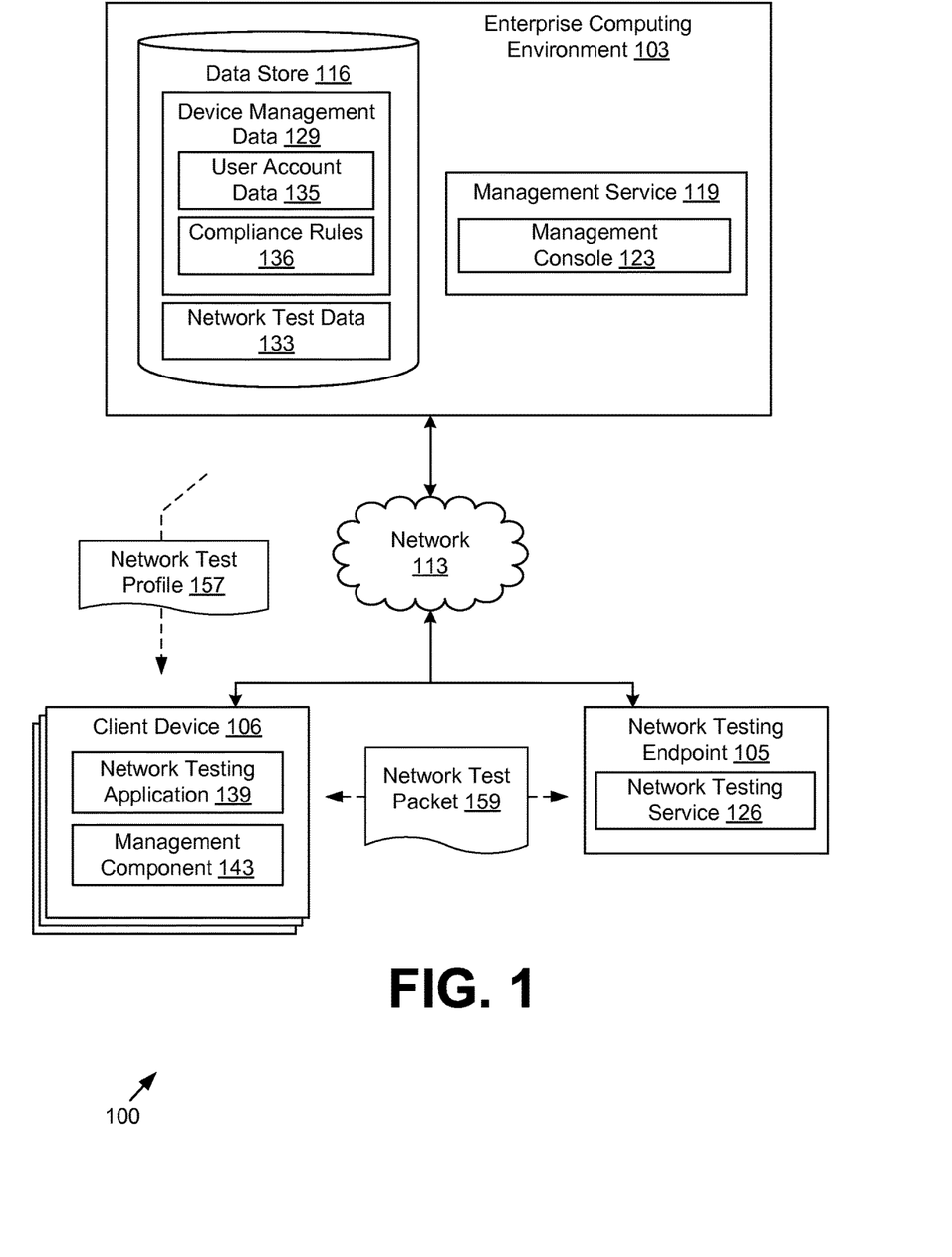
FIG. 1 is a drawing of a networked environment according to various examples.

With reference to FIG. 1, shown is a networked environment 100 according to various examples. The networked environment 100 shown in FIG. 1 includes an enterprise computing environment 103, a network testing endpoint 105, a client device 106, and potentially other components, which are in data communication with each other over a network 113. The network 113 includes, for example, the Internet, one or more intranets, extranets, wide area networks (WANs), local area networks (LANs), wired networks, wireless networks, other suitable networks, or any combination of two or more such networks. Such networks can comprise satellite networks, cable networks, Ethernet networks, telephony networks, and/or other types of networks.

The enterprise computing environment 103 can comprise, for example, a server, server computer or any other system providing computing capabilities. Alternatively, the enterprise computing environment 103 can employ multiple computing devices that can be arranged, for example, in one or more server banks, computer banks, or other arrangements. The computing devices can be located in a single installation or can be distributed among many different geographical locations. For example, the enterprise computing environment 103 can include multiple servers that together form a hosted computing resource, a grid computing resource, and/or any other distributed computing arrangement. In some cases, the enterprise computing environment 103 can operate as at least a portion of an elastic computing resource where the allotted capacity of processing, network, storage, or other computing-related resources can vary over time. The enterprise computing environment 103 can also include or be operated as one or more virtualized computer instances that are executed in order to perform the functionality that is described herein. Generally, the enterprise computing environment 103 can be operated in accordance with particular security protocols such that it is considered a trusted computing environment.

The data store 116 shown in FIG. 1 can be representative of multiple data stores 116 for storing data. The data stored in the data store 116 is associated with the operation of the components described below.

A management service 119 and/or other systems can be executed in the enterprise computing environment 103. The management service 119 can be executed to manage and/or oversee the operation of multiple client devices 106. In some examples, an enterprise, such as one or more companies or other organizations, can operate the management service 119 to oversee and/or manage the operation of the client devices 106 of its employees, contractors, customers, etc. Accordingly, the management service 119 is considered a trusted system.

The management service 119 can include a management console 123 and/or other components. The management service 119 can be executed to manage and/or oversee the operation of multiple client devices 106. For example, an employer can operate the management service 119 to ensure that the client devices 106 of its employees are operating in compliance with compliance rules. By ensuring that the client devices 106 of its employees are operated in compliance with the compliance rules, the employer can control and protect access to data. The management service 119 can also facilitate access to email, calendar data, contact information, documents, or other enterprise data to which an enterprise may wish to provide access by users via client devices 106.

The management console 123 can facilitate administration of devices of an enterprise by administrators via the management service 119. For example, the management console 123 can generate one or more user interfaces that are rendered on a display device to facilitate interaction with the management service 119. Such user interfaces can facilitate an administrator's inputting of commands or other information for the management service 119. Additionally, the user interfaces can include presentations of statistics or other information regarding the client devices 106 that are managed by the management service 119. In some examples, the management console 123 can provide a user interface accessible by an administrator through which the administrator enroll, activate, remove, deactivate, or otherwise manage devices that are employed to access resources via an application or service provided by the enterprise computing environment 103. The user interface can also allow an administrator to define compliance rules with respect to usage of client devices 106 that are assigned to users of an enterprise.

The data stored in the data store 116 includes, for example, device management data 129, network test data 133, and potentially other data. The device management data 129 can include information about particular users of an enterprise as user account data 135. User account data 135 can include data associated with an enterprise user account, such as mailbox data, calendar data, contact data, and other data. User account data 135 can also include access settings, such as authentication credentials, delegation settings (e.g., information about other users who can be provided access to the user account data 135 of a particular user), mail and document retention rules and/or policies, and/or other geographic access restrictions or limitations (e.g., information about certain locations and/or networks from which user account data 135 can be accessed). User account data 135 can also include other account settings, such as biographical or demographic information about a user, password reset information, multi-factor authentication settings, and other data related to a user account.

User account data 135 can also include a network address of a particular management service 119 with which a particular client device 106 should communicate in order to access mailbox data, calendar data, and other corporate data. The user account data 135 can also specify a polling frequency for a particular user account or a client device, which represents a frequency with which a particular client device 106 should communicate or "check in" with the management service 119 for the purposes of reporting status data associated with operation of the client device 106. The user account data 135 can also include a user status indicator with respect to instant messaging, videoconferencing, or other services facilitated by the management service 119. Such a user status indicator can be published in a user directory so that other users within the enterprise can initiate communications with a particular user via the client device 106. In one scenario, the user status indicator can identify a particular user as available or unavailable for instant messaging, videoconferencing, or other form of communication.

Mailbox data can be synchronized with a client device 106 via the management service 119. Mailbox data can include data associated with one or more mailboxes corresponding to a user account of a user. The mailbox data can include electronic mail messages, mail folders into which messages are organized, filtering rules that are applied to incoming and/or outgoing mail messages, attachments associated with mail messages, and/or other data associated with a mailbox of a user. Calendar data can include, for example, calendar information such as appointments, reminders, tasks and/or other data that can be associated with a timestamp or date stamp. Calendar data can include appointments that are associated with a particular location and/or user. For example, an appointment can be linked with a particular location, meeting room, building, address or other location. An appointment can also be linked with another user who is internal or external to an organization or domain of the user as well as with text and/or attachments. Calendar data can also include tasks, reminders, or other types of data that can be associated with a time and/or place and placed on a calendar.

Contact data can include personal information manager (PIM) or address book data related to contacts of a particular user such as internal or external email addresses, telephone contact information, mailing addresses, contact notes, and other information associated with contacts that a user may wish to maintain in an address book or contacts store. Contact data can also include user specific address book data as well as global address book data for address books that are shared among multiple users in a domain and/or enterprise. It should be appreciated that a client device 106 of a user can also be synchronized with various other forms of data other than mailbox data, calendar data and/or contact data and that these are just some examples of data that can be synchronized between an enterprise computing environment 103 and a client device 106.

For example, a client device 106 of a user can also be synchronized or provided access to documents, media or other types of files that are stored in a data store 116 via a remote mail server or other type of synchronization application in accordance with various examples of the present disclosure. The client device 106 can be configured to access such resources that are stored in or on the client device 106, in a data store 116 or any other location via any type of application that is executed by the client device 106, and the depicted example is but one example.

The user account data 135 can include information regarding the client devices 106 that are managed and/or controlled by the management service 119. The user account data 135 for a particular client device 106 can include, for example, the identification of a user assigned to the client device 106, the identification of applications that are installed in the client device 106, historical data regarding the operation of the client device 106, and/or other information.

In addition, the device management data 129 can include one or more compliance rules 136 that are associated with a particular client device 106 or a particular user account within the enterprise. A compliance rule can specify one or more conditions that must be satisfied for a client device 106 to be deemed compliant with the compliance rule. As an example, a compliance rule can specify that particular applications are prohibited from being installed on a client device 106. As another non-limiting example, a compliance rule can specify that a lock screen is required to be generated when the client device 106 is "awoken" from a low power (e.g., "sleep") state and that a passcode is required for a user to unlock the lock screen. Additionally, one or more compliance rules can be based on time, geographical location, and/or other predefined conditions. When the compliance rules for a particular device profile are satisfied, the management service 119 can deem the corresponding client device 106 as being compliant with the device policy.

A compliance rule 136 can also specify one or more actions that should be taken in response to compliance with or a violation of a particular compliance rule 136. For example, if a particular client device 106 exits a particular geographic location or area that is designated as a "geofence" for the client device 106 or a user account, the compliance rule 136 can specify that the management service 119 or software executed by the client device 106 should take a prescribed action with respect to the client device 106. Such a prescribed action can include, for example, deleting certain data from the client device 106, restricting access to certain data from the client device 106, issuing an alert to the client device 106 via electronic mail, SMS, or other communications mechanisms, or taking any other action with respect to the client device.

Compliance rules 136 can also specify actions that can be taken with respect to a client device 106 when a speed of a network connection between the client device 106 and the device management service 119 fails to meet a threshold. For example, a compliance rule 136 can specify that a polling frequency of the client device 106 that identifies how often the client device 106 should communicate with or check in with the management service 119. In one example, the polling frequency can be modified in response to a speed of the network connection of the client device 106 dropping beneath a specified threshold. As another example, a compliance rule 136 can specify that an availability status of a user associated with the client device 106 with respect to a videoconferencing capability, an instant messaging capability, a voice chat or voice calling capability, or any other communication capability of a client device 106. In one example, the availability status can be modified in response a speed of the network connection of the client device 106 meeting or failing to meet a threshold.

For example, should the speed of the network connection of the client device 106 drop below a particular threshold, a compliance rule 136 can specify that a videoconferencing capability of the client device 106 should be disabled or that the user associated with the client device 106 should be designated as unavailable via videoconferencing on the client device 106. As another example, should the speed of the network connection meet the threshold, the status can be updated so that the user is designated as available via videoconferencing. The same analysis can be applied with respect to compliance rules 136 that are associated with an instant messaging capability or a voice capability of the client device 106.

As another example, a compliance rule 136 can specify that the client device 106 should be served lower quality media when the speed of the network connection drops below a particular threshold or higher quality media when the speed meets the threshold. As another example, a compliance rule 136 can specify that the management service 119 should avoid delivering files or files that are larger than a particular size when the speed of the network connection drops below a particular threshold. A compliance rule 136 can specify that the management service 119 should avoid enforcing certain compliance rules 136, such as a remotely enforce compliance rules, when the speed of the network connection drops below a particular threshold. A compliance rule 136 can also specify only those compliance rules 136 that are enforced by the management component 143 should be enforced when the speed of the network connection drops below a threshold.

As another example, a compliance rule 136 can specify that a polling frequency of the management component 143 can be lowered when a speed of the network connection drops below a particular threshold or increased when the speed meets the threshold. Additionally, an amount of data reported when the management component 143 checks in with the management service 119 can be reduced with the speed drops below a threshold. For example, to reduce bandwidth usage, the management component 143 can report less data with respect to the status of the client device 106 when the speed drops below a threshold during a periodic status check in.

As another example, a compliance rule 136 can specify that an email client executed by the client device 106 should avoid automatically downloading attachments associated with an email message if the speed of the network connection fails to meet a particular threshold. If, however, the speed of the network connection does meet the threshold, the email client can automatically download attachments. As another example, a compliance rule 136 can specify that a client device 106 should communicate with a different device management sever 119 located at a different geographical or network location if the speed of the network connection fails to meet a particular threshold. In one scenario, a management service 119 can effectuate an action specified by a compliance rule 136 by transmitting a command to the client device 106 that is executed by the management component 143.

Network test data 133 can represent test results associated with network speed tests conducted by client devices 106 associated with a particular enterprise. An enterprise computing environment 103 can service multiple enterprises or user groups. Accordingly, network test data 133 can facilitate profiling or comparison of network speed tests of a particular enterprise or a set of users with another enterprise or set of users for debugging or other administrative purposes.

The client device 106 is representative of multiple client devices 106 that can be coupled to the network 113. The client device 106 can comprise, for example, a processor-based system such as a computer system. Such a computer system can be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 can include a display as well as one or more input devices, such as a mouse, or touch pad that facilitates a user input.

The client device 106 can be configured to execute a network testing application 139, a management component 143, and/or other components. The network testing application 139 can comprise, for example, one or more programs that facilitate conducting a network speed test that assesses the speed of a network connection of the client device 106. The network test application 139, in some examples, can comprise a browser in which a page is rendered that facilitates conducting a network speed test with a network testing endpoint 105.

The management component 143 can be executed in the client device 106 to monitor and/or manage at least a portion of the data, applications, or hardware components for the client device 106. The management component 143 can also identify whether the client device 106 is operating in accordance with the one or more compliance rules for one or more device profiles that have been assigned to the client device 106. In some examples, the management component 143 can function as a device management service that operates as a portion of an operating system for the client device 106. In other examples, the management component 143 can function as a device management agent that operates in the application layer of the client device 106 and that monitors at least some of the activity being performed in the client device 106. In other examples, the management component 143 can comprise an application wrapper that interfaces with a software component to facilitate overseeing, monitoring, and/or managing one or more resources of the client device 106. Alternatively, the management component 143 can be a portion of an application that was developed, for example, using a Software Development Kit (SDK) that facilitates the inclusion of functionality within the application that monitors and/or manages at least a portion of the resources for the client device 106.

The management component 143 can be executed by the client device 106 automatically upon startup of the client device 106. Additionally, the management component 143 can run as a background process in the client device 106. Accordingly, the management component 143 can execute without user intervention in some examples. Additionally, the management component 143 can communicate with the management service 119 in order to facilitate the management service 119 managing the client device 106. For example, the management component 143 can obtain compliance rules 136 from the management service 119, and the management component 143 can determine whether the client device 106 is operating in accordance with those compliance rules 136. In another example, the management component 143 transmits data that indicates the status of settings for the client device 106, and the management service 119 uses this data to determine whether the client device 106 is operating in accordance with compliance rules 136. If it is determined that the client device 106 is not in compliance with one or more compliance rules, the management component 143 or the management service 119 causes a remedial action to be performed. Examples of remedial actions include notifying a user of the device or an administrator of the management service 119, causing device settings to be changed so that the client device 106 becomes compliant with the compliance rules 136, and erasing data in the client device 106.

The network testing application 139 and/or management component 143 can obtain a network test profile 157 from the management service 119 that identifies a particular network testing endpoint 105 with which network speed tests should be conducted by the client device 106 as well as a schedule by which network speed tests should be conducted by the client device 106. The management service 119 can generate a schedule to account for variances in the speed of a network connection due to changes in network conditions over the course of a day, week, month, or other interval. The testing can also occur in response to an event. For example, when a user opens a video, a network speed test can execute before, during, or after playback of the video on the client device 106. As another example, when the management component 143 detects that a location or roaming state of the client device 106 has changed, a network speed test can execute to determine a speed of the network connection.

The network testing endpoint 105 can comprise, for example, a server computer or any other system providing computing capabilities. Alternatively, the network testing endpoint 105 can employ multiple computing devices that can be arranged, for example, in one or more server banks, computer banks, or other arrangements. The computing devices can be located in a single installation or can be distributed among many different geographical locations. For example, the network testing endpoint 105 can include multiple computing devices that together form a hosted computing resource, a grid computing resource, and/or any other distributed computing arrangement. In some cases, the network testing endpoint 105 can operate as at least a portion of an elastic computing resource where the allotted capacity of processing, network, storage, or other computing-related resources can vary over time. The network testing endpoint 105 can also include or be operated as one or more virtualized computer instances that are executed in order to perform the functionality that is described herein.

The network testing endpoint 105 can be operated by an entity that is a third party relative to the user of the client device 106 and/or the entity that operates the enterprise computing environment 103. The network testing endpoint 105 can be located at an entry point to a private network on which the enterprise computing environment 103 is located so that a speed of a network connection of the client device 106 can be assessed without potential delays of a private network routing or network address translation within the private network. In another scenario, the network testing endpoint 105 can be located at a proxy server that proxies network traffic to a private network on which the enterprise computing environment 103 is located. Various systems can be executed in the network testing endpoint 105, such as the network testing service 126. The network testing service 126 can perform network speed tests with a client device 106 via the network 113.

The network testing service 126 can perform a network speed tests by exchanging at least one network test packet 159 with the network testing application 139 and measuring a speed of the exchange. The speed can be measured in terms of bits per second of data transferred between the client device 106 and the network testing endpoint 105. The network testing service 126 can also provide test results associated with a network speed test to the client device 106 and/or the management service 119.

Next, a description of examples of the operation of the various components in the networked environment 100 is provided. To begin, the user of the client device 106 and/or the entity that operates the enterprise computing environment 103 can enroll the client device 106 with the management service 119. In this sense, the client device 106 can become associated with a particular user account of an enterprise or becomes a device that is managed by the management service 119. Upon enrolling of the client device 106 with the management service 119, the management service 119 can generate a network test profile 157 for the client device 106 that specifies a testing schedule. The network test profile 157 can also specify one or more network testing endpoints 105 with which the network testing application 139 can conduct network speed tests. The management service 119 can then provide the network test profile 157 to the network testing application 139.

The network testing application 139 can then execute one or more network speed tests in accordance with a testing schedule specified by the network test profile 157 and can provide the test results indicating a speed of the network connection of the client device 106 to the management service 119. The test results can also include other data associated with the network connection, such as an internet service provider, a wired or wireless carrier, a network address, a geographic location, a time of day, or other properties associated with conditions under which the speed test was conducted.

In response to receiving the test results, the management service 119 can save the test results as network test data 133 and can facilitate profiling of the network performance of various client devices 106 associated with a particular enterprise of potentially multiple enterprises that are facilitated by the management service 119 and the enterprise computing environment 103. For example, an operator of the management service 119 can analyze how the average speed of the network connection of the various client devices 106 associated with an enterprise compares with other enterprises or is the cause of errors experienced by users of the enterprise.

The management service 119 can also determine whether a network speed of a network connection of a client device 106 violates a particular compliance rule 136 associated with the enterprise of the client device 106 or a user account associated with the client device 106. If so, then the management service 119 can identify an action associated with the compliance rule 136 and can issue a command to the client device 106 instructing the client device 106 to take the prescribed action. The action can be executed by the management component 143 associated with the client device 106. In some examples, the network testing application 139 can provide the test results to the management component 143 executed by the client device 106, which can also determine whether a compliance rule 136 specifies an action that should be taken in response to the result of a network speed test.

Figure 2:
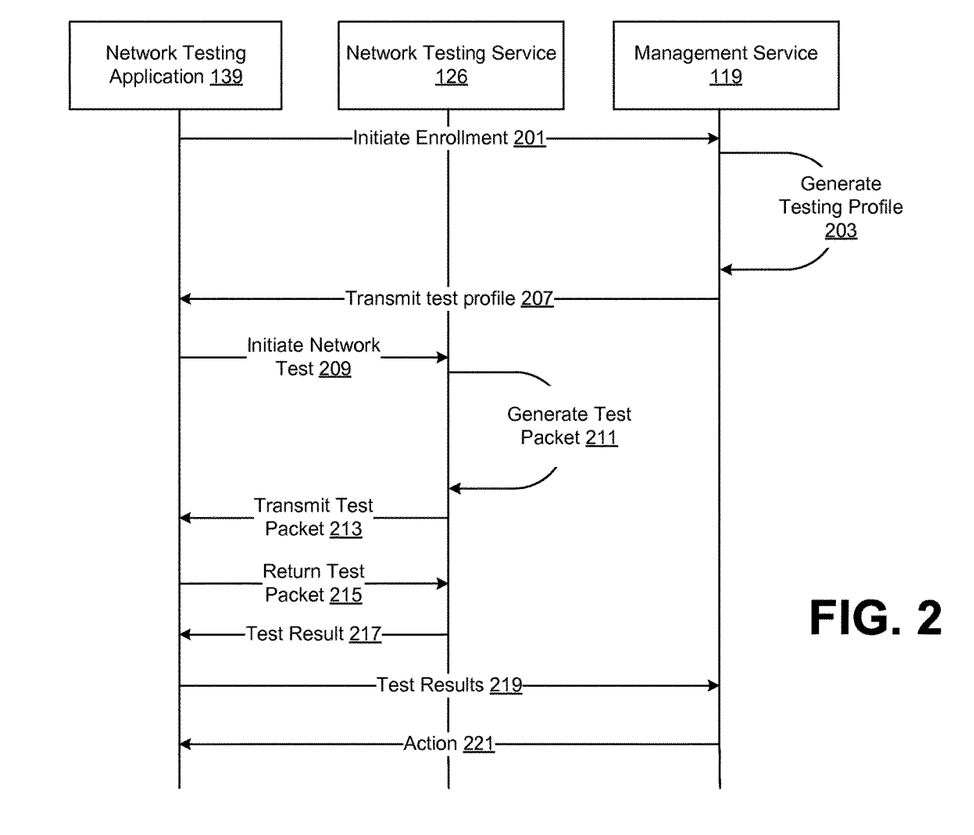
FIG. 2 is a sequence diagram illustrating interactions between elements in the networked environment of FIG. 1.

Reference is now made to FIG. 2, which depicts a sequence diagram illustrating one example of interactions between an enterprise computing environment 103, client device 106 and a network testing endpoint 105 according to one example. FIG. 2 illustrates an example of a client device 106 obtaining a network test profile 157 from a management service 119 and initiating a network speed test with a network testing endpoint 105.

As denoted by step 201, the client device 106 can initiate enrollment with the management service 119. In response to enrollment of the client device 106, the management service 119 can generate a network testing profile 157 for the client device 106 as shown by step 203. The management service 119 can generate the network testing profile 157 that specifies a schedule that the network testing application 139 should employ to conduct network speed tests. The network testing profile 157 can also identify a particular network testing endpoint 105 with which the network testing application 139 should conduct network speed tests.

At step 207, the management service 119 can transmit the network test profile 157 to the network testing application 139. As shown by step 209, the network testing application 139 can initiate a network speed test with a network testing service 126 executed by a particular network testing endpoint 105. As noted above, the network testing endpoint 105 can be located within a proxy server providing access to a private network on which the management service 119 is executed or at an entry point into the private network. At step 211, the network testing service 126 can generate a test packet that can be exchanged between the network testing application 139 and network testing service 126 and from which a network speed of a network connection of the client device 106 can be determined. At step 213, the network testing service 126 can transmit the test packet to the network testing application 139. The network testing application 139 can return the test packet as shown by step 215. It should be appreciated that in some scenarios, the network testing application 139 can generate a test packet that is transmitted to the network testing service 126 rather than the scenario that is depicted in FIG. 2.

As shown by step 217, the network testing service 126 can determine a speed associated with the exchange of the test packet and transmit a test result to the network testing application 139. The network testing application 139 can then transmit the test results to the management service 119 as shown by step 219. It should be appreciated that in some scenarios, the network testing service 126 can transmit the test results to the management service 119. The management service 119 can determine whether the speed reflected in the test results causes a compliance rule 136 associated with the enterprise to be violated. If so, then the management service 119 can transmit a command reflecting an action that the client device 106 should take as shown by step 221.

Figure 3:
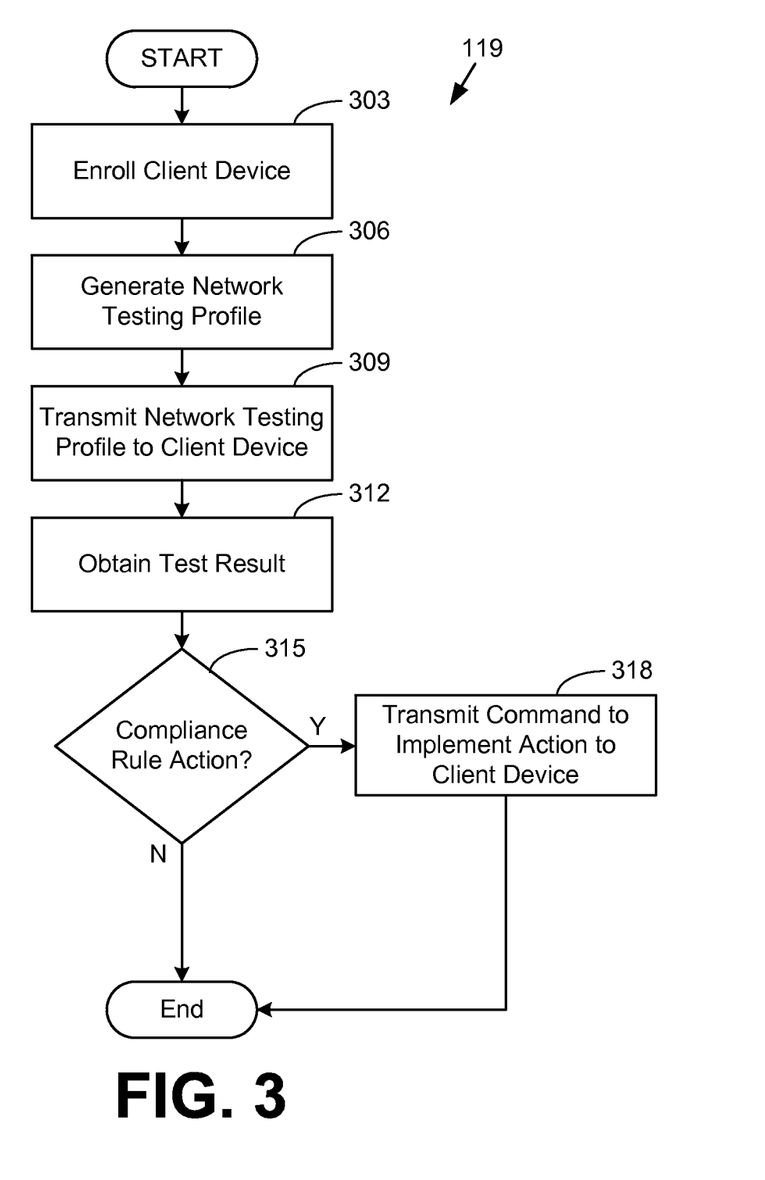
FIG. 3 is a flowchart illustrating an example of functionality implemented by the management service according to various examples.

Referring next to FIG. 3, shown is a flowchart that provides one example of the operation of a portion of the management service 119 according to various examples. It is understood that the flowchart of FIG. 3 provides merely an example of the many different types of functional arrangements that can be employed to implement the operation of the portion of the management service 119 as described herein. As an alternative, the flowchart of FIG. 3 can be viewed as depicting an example of elements of a method implemented in the enterprise computing environment 103 (FIG. 1) according to one or more examples.

Beginning at step 303, the management service 119 can facilitate enrollment of a client device 106 as a managed device associated with a particular enterprise. At step 306, the management service 119 can generate a network testing profile 157 that identifies a schedule that the client device 106 should perform network speed tests as well as identify a network testing endpoint 105 with which network speed tests should be performed. At step 309, the management service 119 can transmit the network test profile 157 to the network testing application 139.

At step 312, the management service 119 can obtain a test result associated with speed tests conducted by the network testing application 139 executed by a client device 106, which can be saved in the data store 116 as network test data 133. At step 315, the management service 119 can determine whether the speed reflected in the test result received from the client device 106 implicates a compliance rule 136. If so, then at step 318, the management service 119 can transmit a command to the client device to implement an action specified by the compliance rule 136. Otherwise, the process can proceed to completion.

Figure 4:
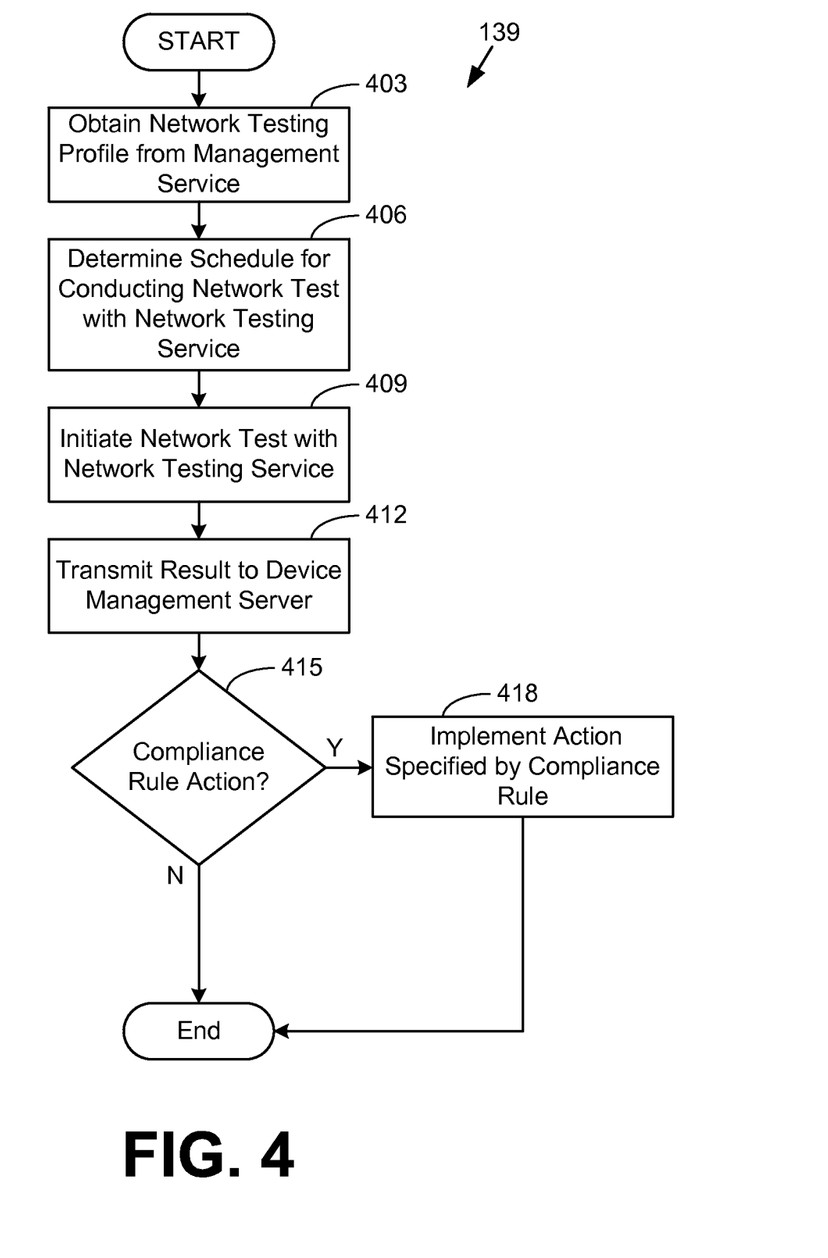
FIG. 4 is a flowchart illustrating an example of functionality implemented by the network testing application according to various examples.

With reference to FIG. 4, shown is a flowchart that provides an example of a portion of the operation of the network testing application 139 according to various examples. In particular, FIG. 4 provides an example of the network testing application 139 obtaining a network testing profile 157 and initiating speed tests to assess the speed of a network connection of the client device 106. As an alternative, the flowchart of FIG. 4 can be viewed as depicting an example of elements of a method implemented in the network testing application 139 according to one or more examples.

At step 403, the network testing application 139 can obtain a network testing profile 157 from the management service 119. As noted above, the network testing profile 157 can specify a testing schedule as well as identify a network testing endpoint 105 with which the network testing application 139 should conduct one or more network speed tests. At step 406, the network testing application 139 can determine a schedule for conducting network speed tests from the network testing profile 157.

At step 409, the network testing application 139 can initiate a network speed test with a network testing endpoint 105 identified by the network testing profile 157. At step 412, the network testing application 139 can transmit a test result associated with the network speed test to the management service 119. At step 415, the network testing application can obtain a command associated with a test result from the management service 119 or determine, from the network speed test, that an action is required based upon a compliance rule 136 specifying an action in response to a determination of the speed of the network connection of the client device 106. At step 418, the network testing application 139 can facilitate implementation of an action specified by a compliance rule 136 should the speed of the network connection implicate a compliance rule 136. Otherwise, the process can proceed to completion.

Figure 5:
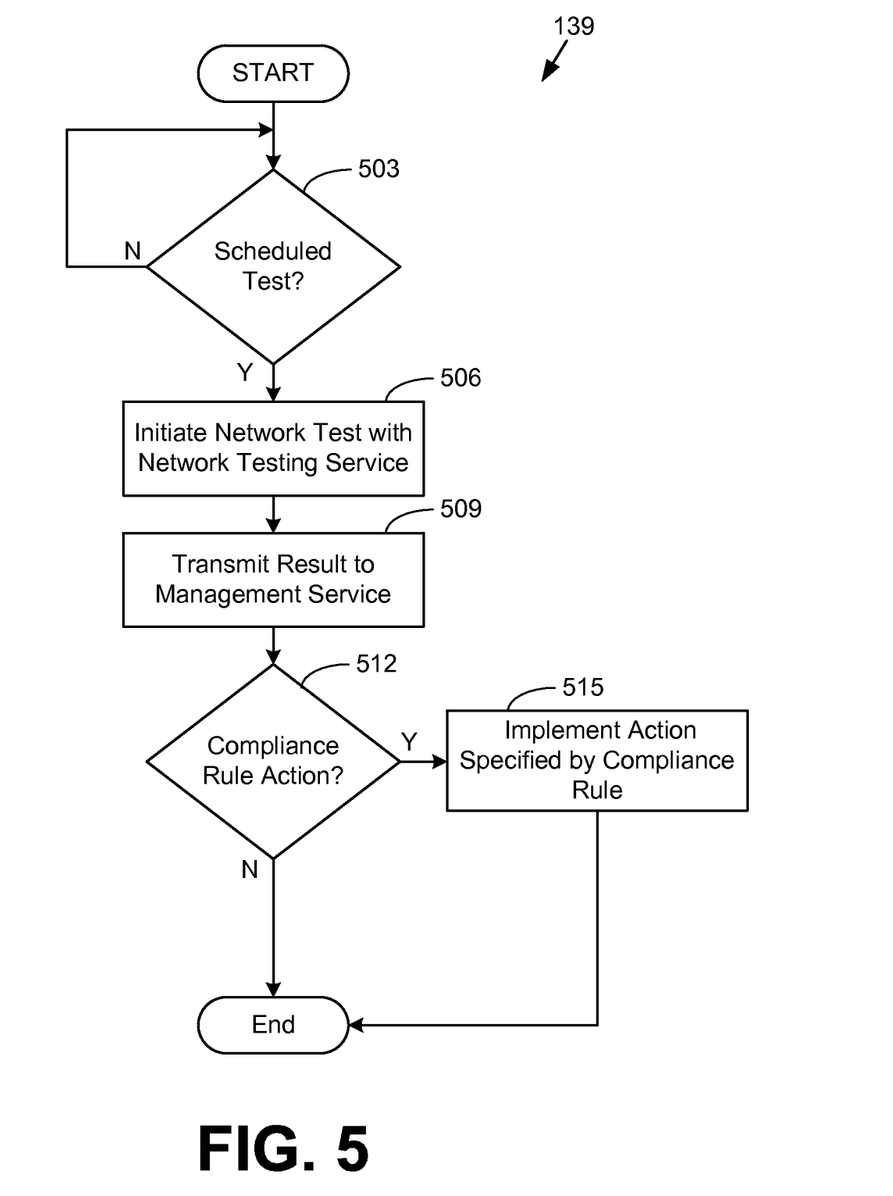
FIG. 5 is a flowchart illustrating an example of functionality implemented by the network testing application according to various examples.

With reference to FIG. 5, shown is a flowchart that provides an example of a portion of the operation of the network testing application 139 according to various examples. In particular, FIG. 5 provides an example of the network testing application 139 initiating speed tests according to a network testing profile 157 to assess the speed of a network connection of the client device 106. As an alternative, the flowchart of FIG. 5 can be viewed as depicting an example of elements of a method implemented in the network testing application 139 according to one or more examples.

At step 503, the network testing application 139 can determine from a network testing profile 157 whether a scheduled network speed test should be conducted. If so, then at step 506, the network testing application 139 can initiate a network speed test with a network testing endpoint 105 identified by the network testing profile 157. At step 509, the network testing application 139 can transmit a test result associated with the network speed test to the management service 119. At step 512, the network testing application 139 can obtain a command associated with a test result from the management service 119 or determine, from the network speed test, that an action is required based upon a compliance rule 136 specifying an action in response to a determination of the speed of the network connection of the client device 106. At step 515, the network testing application 139 can facilitate implementation of an action specified by a compliance rule 136 should the speed of the network connection implicate a compliance rule 136. Otherwise, the process can proceed to completion.

The flowcharts of FIGS. 3-5 show examples of the functionality and operation of implementations of components described herein. The components described herein can be embodied in hardware, software, or a combination of hardware and software. If embodied in software, each element can represent a module of code or a portion of code that comprises program instructions to implement the specified logical function(s). The program instructions can be embodied in the form of, for example, source code that comprises human-readable statements written in a programming language and/or machine code that comprises machine instructions recognizable by a suitable execution system, such as a processor in a computer system or other system. If embodied in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted. The enterprise computing environment 103, the client device 106, the network testing endpoint 105, and/or other components described herein can each include at least one processing circuit. The processing circuit can include, for example, one or more processors and one or more storage devices that are coupled to a local interface. The local interface can comprise, for example, a data bus with an accompanying address/control bus or any other suitable bus structure. The client device 106 or the computing devices or servers in an enterprise computing environment 103 can also include a network interface facilitating communication via the network 113. For example, the network interface can also allow a computing device or server in an enterprise computing environment 103 to transmit or receive data, such as test results associated with a network test, from the client device 113.

The one or more storage devices for a processing circuit can store data and/or components that are executable by the one or more processors of the processing circuit. For example, the management service 119, the network testing application 139, the network testing service 126, and/or other components can be stored in one or more storage devices and be executable by one or more processors. Also, a data store, such as the data store 116 and/or the storage provider data store 146, can be stored in the one or more storage devices.

The management service 119, the network testing application 139, the network testing service 126, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs) and complex programmable logic devices (CPLDs)).

Also, one or more of the components described herein that comprise software or program instructions can be embodied in any non-transitory computer-readable medium for use by or in connection with an instruction execution system such as, for example, a processor in a computer system or other system. The computer-readable medium can contain, store, and/or maintain the software or program instructions for use by or in connection with the instruction execution system.

A computer-readable medium can comprise a physical media, such as, magnetic, optical, semiconductor, and/or other suitable media. Examples of a suitable computer-readable media include, but are not limited to, solid-state drives, magnetic drives, flash memory, etc. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A method, comprising:
   generating, by a management service, a network testing profile for a client device, the client device enrolled with the management service as a managed device using a management component installed on the client device and the network testing profile comprising a network testing schedule;
   transmitting, from the management service, the network testing profile to the client device, wherein the testing schedule specifies a schedule for execution of at least one network test with a particular network testing endpoint;
   receiving, in response to transmitting the network testing profile, at least one test result associated with the client device based upon exchange of at least one test packet with the particular network testing endpoint and the client device;
   saving, in a data store in communication with the management service, the at least one test result;
   determining, by the management service, that a network speed of a connection between the client device and the particular network endpoint fails to meet a threshold; and
   causing, by the management service, a polling frequency specifying how often the management component is required to check in with the management service to be modified in response to determining that the network speed of the connection fails to meet the threshold.

2. The method of claim 1, further comprising saving, based upon the at least one test result, a location of the client device in association with the result.

3. The method of claim 2, wherein the location of the client device comprises at least one of a geographical location, a network address associated with the client device, a wireless carrier associated with the client device, or an internet service provider associated with the client device.

4. The method of claim 1, further comprising:
   identifying, in the management service, a compliance rule associated with the client device specifying a particular network speed;
   determining, by the management service, an action associated with the compliance rule; and
   transmitting, from the management service, a command instructing the client device to take the action in response to the at least one test result.

5. The method of claim 4, wherein the action comprises altering an availability status of a user associated with the client device with respect to a communication capability of the client device in response to the network speed failing to meet the particular network speed.

6. The method of claim 1, further comprising
   identifying another server executing the management service with which to associate the client device in response to determining that the network speed fails to meet the threshold; and
   transmitting, from the management service, a command to the client device to communicate with the other server executing the management service.

7. The method of claim 1, wherein the particular network testing endpoint is associated with a proxy server through which communications to the management service are directed.

8. The method of claim 1, wherein the particular network testing endpoint is located at an entry point to a private network in which the management service is located.

9. A non-transitory computer-readable medium embodying a program executable in a client device, the program, when executed by the client device, being configured to cause the client device to at least:
   obtain a network testing profile from at least one computing device;
   determine, from the network testing profile, a schedule for conducting a network speed test by the client device;
   connect to a testing endpoint during at least one scheduled time specified by the schedule;
   exchange at least one test packet with the testing endpoint at the at least one scheduled time; and
   apply at least one compliance rule obtained from the at least one computing device, the compliance rule specifying a first action based at least in part upon a network speed associated with the network speed test failing to meet a threshold and a second action based at least in part upon the network speed meeting the threshold, the first action comprising disabling background downloading of data when the network speed fails to meet a threshold and enabling background downloading of data when the network speed meets the threshold.

10. The non-transitory computer-readable medium of claim 9, further comprising obtaining the network speed from the testing endpoint, the network speed being determined based on the exchange of the at least one test packet with the testing endpoint.

11. The non-transitory computer-readable medium of claim 9, wherein the at least one compliance rule further specifies a third action when the network speed fails to meet the threshold and a fourth action when the network speed meets the threshold.

12. The non-transitory computer-readable medium of claim 11, wherein the third action comprises disabling a videoconferencing capability associated with the client device and the fourth action comprises enabling the videoconferencing capability.

13. The non-transitory computer-readable medium of claim 9, wherein the program causes the client device to at least select an updated management service with which the client device is associated, the updated management service being different from a previous management service associated with the client device.

14. The non-transitory computer-readable medium of claim 13, wherein the updated management service is located at a different network address relative to the previous management service.

15. The non-transitory computer-readable medium of claim 9, wherein the program causes the client device to alter a polling frequency specifying how often a management component is required to check in with a management service in response to the network failing to meet the threshold.

16. A non-transitory computer-readable medium embodying a program executable in a computing device, the program, when executed by the computing device, being configured to cause the computing device to at least:
   generate a network testing profile for a client device, the client device enrolled with a management service executed by the computing device as a managed device using a management component installed on the client device and the network testing profile comprising a network testing schedule;
   transmit, using a network interface associated with the computing device, the network testing profile to the client device, the network testing profile specifying a schedule for execution of at least one network test with a particular network testing endpoint;
   receive, by the computing device, at least one test result associated with the client device based upon exchange of at least one test packet between the particular network testing endpoint and the client device;
   save, in a data store accessible to the computing device, the at least one test result associated with the network test;
   determine that a network speed of a connection between the client device and the particular network endpoint fails to meet a threshold; and
   cause a polling frequency specifying how often the management component is required to check in with the management service to be modified in response to determining that the network speed of the connection fails to meet the threshold.

17. The non-transitory computer-readable medium of claim 16, wherein a location of the client device is saved in association with the result.

18. The non-transitory computer-readable medium of claim 17, wherein the location of the client device comprises at least one of a geographical location, a network address associated with the client device, a wireless carrier associated with the client device or an interne service provider associated with the client device.

19. The non-transitory computer-readable medium of claim 16, wherein the management service further causes the computing device to at least:
   identify a compliance rule associated with the client device specifying a network speed threshold;
   determine an action associated with the compliance rule; and
   transmit a command instructing the client device to take the action in response to the network speed failing to meet the network speed threshold.

20. The non-transitory computer-readable medium of claim 16, wherein the management service further causes the computing device to at least:
   determining that the at least one test result reflects a network speed that fails to meet the threshold;
   identify another server executing the management service with which to associate the client device; and
   transmit, from the server, a command to the client device to communicate with the other server.

* * * * *